(12) United States Patent
Amamoto

(10) Patent No.: US 12,017,631 B2
(45) Date of Patent: Jun. 25, 2024

(54) BRAKING CONTROL DEVICE

(71) Applicant: ADVICS CO., LTD., Kariya (JP)

(72) Inventor: Kei Amamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 395 days.

(21) Appl. No.: 17/417,971

(22) PCT Filed: Dec. 25, 2019

(86) PCT No.: PCT/JP2019/050762
§ 371 (c)(1),
(2) Date: Jun. 24, 2021

(87) PCT Pub. No.: WO2020/138142
PCT Pub. Date: Jul. 2, 2020

(65) Prior Publication Data
US 2022/0073043 A1  Mar. 10, 2022

(30) Foreign Application Priority Data
Dec. 27, 2018 (JP) .................................. 2018-244202

(51) Int. Cl.
*B60T 8/74* (2006.01)

(52) U.S. Cl.
CPC ............. *B60T 8/74* (2013.01); *B60T 2270/10* (2013.01)

(58) Field of Classification Search
CPC ............................... B60T 8/74; B60T 2270/10
See application file for complete search history.

(56) References Cited

U.S. PATENT DOCUMENTS

| 5,203,821 A | 4/1993 | Tanaka |
| 10,933,849 B2 * | 3/2021 | Arsenault ............. B60T 8/1766 |
| 2009/0076699 A1 | 3/2009 | Osaki et al. |
| 2020/0130661 A1 * | 4/2020 | Arsenault ............... B64C 25/46 |

FOREIGN PATENT DOCUMENTS

| JP | H03109163 A | 5/1991 |
| JP | 2009067358 A | 4/2009 |

OTHER PUBLICATIONS

International Search Report (PCT/ISA/210) and Written Opinion (PCT/ISA/237) dated Feb. 10, 2020, by the Japan Patent Office as the International Searching Authority for International Application No. PCT/JP2019/050762.

* cited by examiner

*Primary Examiner* — Khoi H Tran
*Assistant Examiner* — Aaron G Cain
(74) *Attorney, Agent, or Firm* — BUCHANAN INGERSOLL & ROONEY PC

(57) ABSTRACT

The present disclosure relates to a braking control device that executes an anti-skid control for reducing a braking force when a difference between a target deceleration and an actual deceleration of a vehicle is greater than or equal to a reference value in a braking state in which the braking force is applied to a wheel according to an increase in the target deceleration of the vehicle, the braking control device including a control unit that executes a specific control for reducing an intervention degree of the anti-skid control as a response delay of the actual deceleration with respect to the increase in the target deceleration in the braking state becomes larger.

4 Claims, 2 Drawing Sheets

BRAKING CONTROL DEVICE

TECHNICAL FIELD

The present disclosure relates to a braking control device.

BACKGROUND ART

The braking control device is configured to be capable of executing anti-skid control (or also referred to as ABS control) for suppressing the wheel from being in a locked state at the time of braking. For example, Japanese Unexamined Patent Application Publication No. 3-109163 discloses a device that detects a failure of an acceleration sensor with respect to a control device that determines high and low of a road surface friction coefficient based on a detection result of an acceleration sensor, and changes detection sensitivity of a lock tendency of a wheel. The control device determines whether the vehicle has a tendency to lock based on the deceleration of the vehicle, and executes the anti-skid control according to the determination result.

CITATIONS LIST

Patent Literature

Patent Literature 1: Japanese Unexamined Patent Application Publication No. 3-109163

SUMMARY

Technical Problems

However, in the conventional configuration in which the anti-skid control is executed based on the deceleration of the vehicle as described above, a response delay of the deceleration with respect to the request of the driver is not taken into consideration. That is, there is room for improvement in the above configuration from the viewpoint of improving the execution accuracy of the anti-skid control.

The present disclosure has been made in view of such circumstances, and an object thereof is to provide a braking control device capable of improving the execution accuracy of the anti-skid control.

Solutions to Problems

A braking control device of the present disclosure is a braking control device that executes an anti-skid control for reducing a braking force when a difference between a target deceleration and an actual deceleration of a vehicle is greater than or equal to a reference value in a braking state in which the braking force is applied to a wheel of the vehicle according to an increase in the target deceleration of the vehicle, the braking control device including a control unit that executes a specific control for reducing an intervention degree of the anti-skid control as a response delay of the actual deceleration with respect to the increase in the target deceleration in the braking state becomes larger.

Advantageous Effects of Disclosure

According to the present disclosure, execution of the anti-skid control is suppressed by the specific control when the difference between the target deceleration and the actual deceleration increases due to a response delay on the device configuration instead of the slip. If the cause of the difference between the target deceleration and the actual deceleration is the response delay, the braking force increases with lapse of time, and thus the anti-skid control is unnecessary. According to the present disclosure, the anti-skid control can be suppressed from being executed in a situation where the anti-skid control is unnecessary, and the execution accuracy of the anti-skid control can be improved.

DESCRIPTION OF EMBODIMENT

Hereinafter, a braking control device according to an embodiment will be described based on the drawings. Each figure used for the description is a conceptual view, and the shape of each portion is not necessarily exact in some cases.

Figure 1:
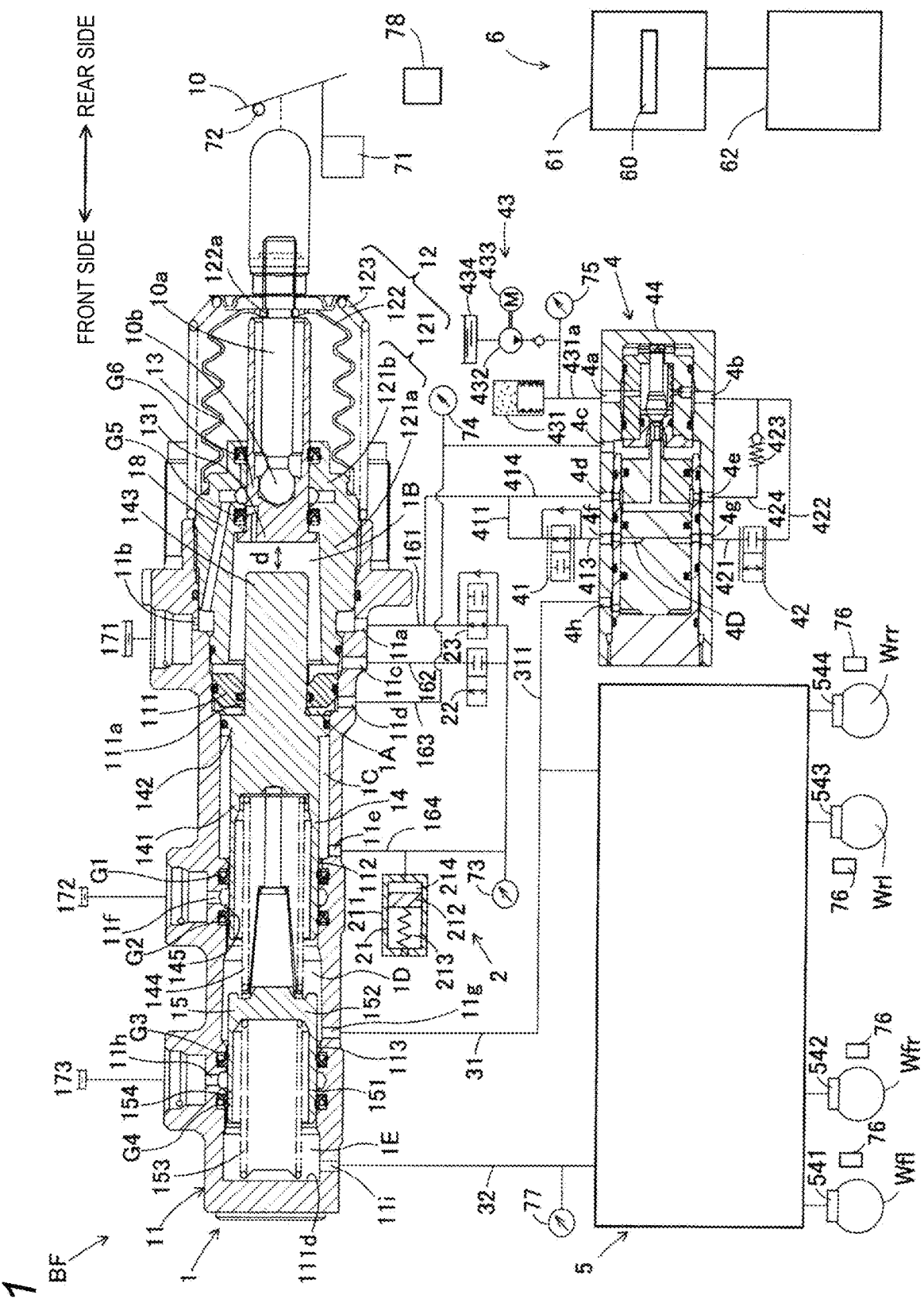
FIG. 1 is a configuration diagram of a vehicle braking device including a braking control device of the present embodiment.

As illustrated in FIG. 1, a vehicle braking device BF includes a master cylinder unit 1, a reaction force generation device 2, a first control valve 22, a second control valve 23, a servo pressure generation device 4 which is an upstream pressurization device, an actuator 5 which is a downstream pressurization device, wheel cylinders 541 to 544, various sensors 71 to 78, and a braking control device 6. The braking control device 6 of the present embodiment includes two ECUs, that is, a first brake ECU 61 and a second brake ECU 62. In the description, the wheels Wfl, Wfr, Wrl, and Wrr may be referred to as a wheel W, where the front wheels Wfl and Wfr may be referred to as a front wheel Wf, and the rear wheels Wrl and Wrr may be referred to as a rear wheel Wr. A disc brake device or a drum brake device is installed on each wheel W.

The master cylinder unit 1 is a part that supplies brake fluid to the actuator 5 in accordance with the operation amount of a brake pedal (brake operation member) 10, and includes a main cylinder 11, a cover cylinder 12, an input piston 13, a first master piston 14 and a second master piston 15. The brake pedal 10 merely needs to be a brake operating means that is brake operable by a driver.

The main cylinder 11 is a bottomed, substantially cylindrical housing that is closed on the front side and opened on the rear side. An inner wall portion 111 that projects out in an inward flange shape is provided closer to the rear side on the inner peripheral side of the main cylinder 11. The center of the inner wall portion 111 is a through hole 111a penetrating in the front and rear direction. Furthermore, on the front side of the inner wall portion 111 inside the main cylinder 11, smaller-diameter parts 112 (rear side) and 113 (front side), which inner diameters are slightly smaller, are provided. That is, the smaller-diameter parts 112 and 113 project out in an inward annular shape from the inner peripheral surface of the main cylinder 11. The first master piston 14 is disposed inside the main cylinder 11 to slidably contact the smaller-diameter part 112 and to be movable in an axial direction. Similarly, the second master piston 15 is disposed to slidably contact the smaller-diameter part 113 and to be movable in the axial direction.

The cover cylinder 12 is configured by a substantially cylindrical cylinder portion 121, a bellows tubular boot 122, and a cup-shaped compression spring 123. The cylinder portion 121 is disposed on the rear end side of the main cylinder 11 and coaxially fitted to an opening on the rear side of the main cylinder 11. The inner diameter of a front part 121*a* of the cylinder portion 121 is larger than the inner diameter of the through hole 111*a* of the inner wall portion 111. Furthermore, the inner diameter of a rear part 121*b* of the cylinder portion 121 is smaller than the inner diameter of the front part 121*a*.

A dustproof boot 122 is assembled so as to come into contact with the rear end side opening of the cylinder portion 121. A through hole 122*a* is formed at the center of the rear side of the boot 122. The compression spring 123 is a coil-shaped biasing member disposed around the boot 122. The rear end of the boot 122 and the rear end of the compression spring 123 are coupled to an operation rod 10*a*. The compression spring 123 biases the operation rod 10*a* toward the rear side.

The input piston 13 is a piston that slidably moves within the cover cylinder 12 according to the operation of the brake pedal 10. The input piston 13 is a bottomed substantially cylindrical piston having a bottom surface on the front side and an opening on the rear side. A bottom wall 131 forming the bottom surface of the input piston 13 has a larger diameter than other parts of the input piston 13. The input piston 13 is disposed to be axially slidable and liquid tightly on the rear part 121*b* of the cylinder portion 121, and the bottom wall 131 is entered to the inner peripheral side of the front part 121*a* of the cylinder portion 121.

The operation rod 10*a* that cooperatively operates with the brake pedal 10 is disposed inside the input piston 13. A pivot 10*b* at the distal end of the operation rod 10*a* can push the input piston 13 toward the front side. The rear end of the operation rod 10*a* projects out to the outside through the opening on the rear side of the input piston 13 and the through hole 122*a* of the boot 122 and is connected to the brake pedal 10. When the brake pedal 10 is depressed, the operation rod 10*a* moves forward while pushing the boot 122 and the compression spring 123 in the axial direction. The input piston 13 also moves forward in cooperation with the forward movement of the operation rod 10*a*.

The first master piston 14 is disposed to be axially slidable on the inner wall portion 111 of the main cylinder 11. The first master piston 14 is integrally formed with a pressurizing tube portion 141, a flange portion 142, and a projecting portion 143 in order from the front side. The pressurizing tube portion 141 is formed to a bottomed substantially cylindrical shape having an opening on the front side, has a gap formed with the inner peripheral surface of the main cylinder 11, and is in sliding contact with the smaller-diameter part 112. A coil spring-shaped biasing member 144 is disposed in between the second master piston 15 in an internal space of the pressurizing tube portion 141. The first master piston 14 is biased toward the rear side by the biasing member 144. In other words, the first master piston 14 is biased by the biasing member 144 toward a set initial position.

The flange portion 142 has a larger diameter than the pressurizing tube portion 141 and is in sliding contact with the inner peripheral surface of the main cylinder 11. The projecting portion 143 has a smaller diameter than the flange portion 142 and is disposed to slidably move, in a liquid tight manner, into the through hole 111*a* of the inner wall portion 111. The rear end of the projecting portion 143 passes through the through hole 111*a* and projects out into the internal space of the cylinder portion 121, and is spaced apart from the inner peripheral surface of the cylinder portion 121. A rear end face of the projecting portion 143 is configured to be spaced apart from the bottom wall 131 of the input piston 13 so that its separation distance d can be changed. As described above, the first master piston 14 is disposed in front of the input piston 13 by the separation distance d from the input piston 13 in the initial state.

Here, a "first master chamber 1D" is defined by the inner peripheral surface of the main cylinder 11, the front side of the pressurizing tube portion 141 of the first master piston 14, and the rear side of the second master piston 15. Furthermore, a rear chamber on the rear side of the first master chamber 1D is defined by the inner peripheral surface (inner peripheral portion) of the main cylinder 11, the smaller-diameter part 112, the front surface of the inner wall portion 111, and the outer peripheral surface of the first master piston 14. The front end part and the rear end part of the flange portion 142 of the first master piston 14 divide the rear chamber to the front and the rear, where a "second fluid pressure chamber 1C" is defined on the front side, and a "servo chamber 1A" is defined on the rear side. The volume of the second fluid pressure chamber 1C decreases as the first master piston 14 moves forward, and the volume increases as the first master piston 14 moves rearward. Furthermore, a "first fluid pressure chamber 1B" is defined by the inner peripheral portion of the main cylinder 11, the rear surface of the inner wall portion 111, the inner peripheral surface (inner peripheral portion) of the front part 121*a* of the cylinder portion 121, the projecting portion 143 (rear end part) of the first master piston 14, and the front end part of the input piston 13.

The second master piston 15 is disposed on the front side of the first master piston 14 in the main cylinder 11 to slidably contact the smaller-diameter part 113 and to be movable in the axial direction. The second master piston 15 is integrally formed with a tubular pressurizing tube portion 151 having an opening on the front side, and a bottom wall 152 that closes the rear side of the pressurizing tube portion 151. The bottom wall 152 journals the biasing member 144 between itself and the first master piston 14. A coil spring-shaped biasing member 153 is disposed in the internal space of the pressurizing tube portion 151 in between the closed inner bottom surface 111*d* of the main cylinder 11. The second master piston 15 is biased toward the rear side by the biasing member 153. In other words, the second master piston 15 is biased by the biasing member 153 toward a set initial position. A "second master chamber 1E" is defined by the inner peripheral surface of the main cylinder 11, the inner bottom surface 111*d*, and the second master piston 15.

The master cylinder unit 1 is formed with ports 11*a* to 11*i* that communicate the inside with the outside. The port 11*a* is formed on the rear side of the inner wall portion 111 of the main cylinder 11. The port 11*b* is formed facing the port 11*a* at a similar position in the axial direction as the port 11*a*. The port 11*a* and the port 11*b* communicate through an annular space between the inner peripheral surface of the main cylinder 11 and the outer peripheral surface of the cylinder portion 121. The port 11*a* and the port 11*b* are connected to a pipe 161 and connected to a reservoir 171 (low pressure source).

The port 11*b* is in communication with the first fluid pressure chamber 1B by a passage 18 formed in the cylinder portion 121 and the input piston 13. The passage 18 is shut off when the input piston 13 moves forward, so that the first fluid pressure chamber 1B and the reservoir 171 are shut off. The port 11*c* is formed on the rear side of the inner wall portion 111 and on the front side of the port 11*a*, and communicates the first fluid pressure chamber 1B and a pipe 162. The port 11*d* is formed on the front side of the port 11*c*, and communicates the servo chamber 1A and a pipe 163.

The port 11e is formed on the front side of the port 11d, and communicates the second fluid pressure chamber 1C and a pipe 164.

The port 11f is formed between seal members G1 and G2 of the smaller-diameter part 112, and communicates the reservoir 172 and the inside of the main cylinder 11. The port 11f is in communication with the first master chamber 1D through a passage 145 formed in the first master piston 14. The passage 145 is formed at a position where the port 11f and the first master chamber 1D are shut off when the first master piston 14 moves forward. The port 11g is formed on the front side of the port 11f, and communicates the first master chamber 1D and a duct 31.

The port 11h is formed between seal members G3 and G4 of the smaller-diameter part 113, and communicates the reservoir 173 and the inside of the main cylinder 11. The port 11h is in communication with the second master chamber 1E through a passage 154 formed in the pressurizing tube portion 151 of the second master piston 15. The passage 154 is formed at a position where the port 11h and the second master chamber 1E are shut off when the second master piston 15 moves forward. The port 11i is formed on the front side of the port 11h, and communicates the second master chamber 1E and a duct 32.

Furthermore, in the master cylinder unit 1, a seal member such as an O-ring is appropriately disposed. The seal members G1 and G2 are disposed in the smaller-diameter part 112 and are liquid tightly abutted to the outer peripheral surface of the first master piston 14. Similarly, the seal members G3 and G4 are disposed in the smaller-diameter part 113 and are liquid tightly abutted to the outer peripheral surface of the second master piston 15. Furthermore, seal members G5 and G6 are also disposed between the input piston 13 and the cylinder portion 121.

The stroke sensor 71 is a sensor that detects an operation amount (stroke) at which the brake pedal 10 is operated by the driver, and transmits a detection signal to the first brake ECU 61. A brake stop switch 72 is a switch for detecting the presence or absence of the operation of the brake pedal 10 by the driver with a binary signal, and transmits a detection signal to the first brake ECU 61.

The reaction force generation device 2 is a device that generates a reaction force against the operating force when the brake pedal 10 is operated. The reaction force generation device 2 mainly configures a stroke simulator 21. The stroke simulator 21 generates a reaction force fluid pressure in the first fluid pressure chamber 1B and the second fluid pressure chamber 1C in accordance with the operation of the brake pedal 10. The stroke simulator 21 is configured by slidably fitting a piston 212 to a cylinder 211. The piston 212 is biased toward the rear side by the compression spring 213, and a reaction force fluid pressure chamber 214 is formed on the rear surface side of the piston 212. The reaction force fluid pressure chamber 214 is connected to the second fluid pressure chamber 1C through the pipe 164 and the port 11e, and furthermore, the reaction force fluid pressure chamber 214 is connected to the first control valve 22 and the second control valve 23 through the pipe 164.

The first control valve 22 is a normally-closed type electromagnetic valve, and opening/closing thereof is controlled by the first brake ECU 61. The first control valve 22 is connected between the pipe 164 and the pipe 162. Here, the pipe 164 is in communication with the second fluid pressure chamber 1C through the port 11e, and the pipe 162 is in communication with the first fluid pressure chamber 1B through the port 11c. The first fluid pressure chamber 1B is in an opened state when the first control valve 22 is opened, and the first fluid pressure chamber 1B is in a sealed state when the first control valve 22 is closed. Therefore, the pipe 164 and the pipe 162 are provided to communicate the first fluid pressure chamber 1B and the second fluid pressure chamber 1C.

The first control valve 22 is closed in a non-energized state in which current is not flowed, and at this time, the first fluid pressure chamber 1B and the second fluid pressure chamber 1C are shut off. As a result, the first fluid pressure chamber 1B is in a sealed state and there is no place for the brake fluid to move, and the input piston 13 and the first master piston 14 move in cooperation with each other while maintaining a constant separation distance. Furthermore, the first control valve 22 is opened in an energized state in which current is flowed, and at this time, the first fluid pressure chamber 1B and the second fluid pressure chamber 1C are communicated. As a result, the change in volume of the first fluid pressure chamber 1B and the second fluid pressure chamber 1C involved in the forward and rearward movement of the first master piston 14 is absorbed by the movement of the brake fluid.

A pressure sensor 73 is a sensor that detects the reaction force fluid pressure of the second fluid pressure chamber 1C and the first fluid pressure chamber 1B, and is connected to the pipe 164. The pressure sensor 73 detects the pressure in the second fluid pressure chamber 1C when the first control valve 22 is in a closed state, and also detects the pressure in the communicated first fluid pressure chamber 1B when the first control valve 22 is in an opened state. The pressure sensor 73 transmits the detection signal to the first brake ECU 61.

The second control valve 23 is a normally-open type electromagnetic valve, and opening/closing thereof is controlled by the first brake ECU 61. The second control valve 23 is connected between the pipe 164 and the pipe 161. Here, the pipe 164 is in communication with the second fluid pressure chamber 1C through the port 11e, and the pipe 161 is in communication with the reservoir 171 through the port 11a. Therefore, the second control valve 23 communicates the second fluid pressure chamber 1C and the reservoir 171 in the non-energized state so as not to generate the reaction force fluid pressure, and shuts off the second fluid pressure chamber and the reservoir in the energized state so as to generate the reaction force fluid pressure.

The servo pressure generation device 4 is a so-called hydraulic booster (booster device), and includes a pressure-reducing valve 41, a pressure-increasing valve 42, a pressure supplying unit 43, and a regulator 44. The pressure-reducing valve 41 is a normally-open type electromagnetic valve that opens in a non-energized state, and the flow rate (or pressure) thereof is controlled by the first brake ECU 61. One side of the pressure-reducing valve 41 is connected to the pipe 161 through a pipe 411, and the other side of the pressure-reducing valve 41 is connected to a pipe 413. That is, one side of the pressure-reducing valve 41 is in communication with the reservoir 171 through the pipes 411 and 161 and the ports 11a and 11b. The brake fluid is prevented from flowing out of a pilot chamber 4D by closing the pressure-reducing valve 41. The reservoir 171 and a reservoir 434 communicate with each other, although not shown. The reservoir 171 and the reservoir 434 may be the same reservoir.

The pressure-increasing valve 42 is a normally-closed type electromagnetic valve that closes in a non-energized state, and the flow rate (or pressure) thereof is controlled by the first brake ECU 61. One side of the pressure-increasing valve 42 is connected to a pipe 421, and the other side of the pressure-increasing valve 42 is connected to a pipe 422. The pressure supplying unit 43 is a part that mainly supplies a high-pressure brake fluid to the regulator 44. The pressure supplying unit 43 includes an accumulator 431, a fluid pressure pump 432, a motor 433, and the reservoir 434. The pressure sensor 75 detects the fluid pressure in the accumulator 431 (hereinafter referred to as "accumulator pressure"). When the accumulator pressure becomes less than a predetermined pressure, the first brake ECU 61 drives the motor 433 and the pump 432 to maintain the accumulator pressure at greater than or equal to the predetermined pressure.

The regulator 44 is a mechanical regulator and has a pilot chamber 4D formed therein. The regulator 44 has a plurality of ports 4a to 4h. The pilot chamber 4D is connected to the pressure-reducing valve 41 through the port 4f and the pipe 413, and is connected to the pressure-increasing valve 42 through the port 4g and the pipe 421. With the opening of the pressure-increasing valve 42, high-pressure brake fluid is supplied from the accumulator 431 to the pilot chamber 4D through the ports 4a, 4b, and 4g, the piston is moved, and the pilot chamber 4D is enlarged. The valve member moves according to the enlargement, whereby the port 4a communicates with the port 4c, and high-pressure brake fluid is supplied to the servo chamber 1A through the pipe 163. On the other hand, with the opening of the pressure-reducing valve 41, the fluid pressure (pilot pressure) of the pilot chamber 4D reduces, and the flow path between the port 4a and the port 4c is shut off by the valve member.

Thus, the first brake ECU 61 controls the pilot pressure corresponding to the servo pressure and thus controls the servo pressure by controlling the pressure-reducing valve 41 and the pressure-increasing valve 42. The servo pressure is a pressure that corresponds to the pilot pressure or the master pressure, and is detected by the pressure sensor 74. The first brake ECU 61 controls the servo pressure generation device 4 so that the servo pressure approaches the target servo pressure. The target servo pressure is set based on, for example, a target wheel pressure (target deceleration, target braking force) set according to a brake operation of the driver.

The actuator 5 is disposed between the first master chamber 1D and the second master chamber 1E, where the master pressure is generated, and the wheel cylinders 541 to 544. The actuator 5 and the first master chamber 1D are connected by the duct 31, and the actuator 5 and the second master chamber 1E are connected by the duct 32. The actuator 5 is a device that adjusts the hydraulic pressure (wheel pressure) of the wheel cylinders 541 to 544 in accordance with an instruction from the second brake ECU 62. The actuator 5 is a known ESC actuator, and includes a plurality of electromagnetic valves (not illustrated), a pump, a reservoir, and the like.

The actuator 5 executes pressurization control, depressurization control, or holding control in accordance with a command from the second brake ECU 62. The actuator 5 executes anti-skid control, side slip prevention control, or the like by combining these controls on the basis of a command from the second brake ECU 62. Each wheel W is installed with a wheel speed sensor 76. The detection result of the wheel speed sensor 76 is transmitted to the second brake ECU 62. The second brake ECU 62 controls execution of the anti-skid control based on the wheel speed information acquired by the wheel speed sensor 76. Note that the actuator 5 may be an ABS actuator without pressurization function.

(Braking Control Device)

The first brake ECU 61 and the second brake ECU 62 constituting the braking control device 6 are electronic control units each including a CPU, a memory, and the like. The first brake ECU 61 and the second brake ECU 62 are configured to be able to communicate with each other. The first brake ECU 61 is an ECU that executes control on the servo pressure generation device 4 based on a target wheel pressure, which is a target value of the wheel pressure. The target wheel pressure corresponds to the target braking force (required braking force) and the target deceleration (required deceleration), and is set, for example, according to the brake operation of the driver. The first brake ECU 61 can be said to be a device that controls the fluid pressure on the upstream side, that is, the servo pressure or the master pressure. Each wheel pressure can be calculated (estimated) from the detection result of the pressure sensor 74 or the pressure sensor 77 and the control state of the actuator 5. Furthermore, the vehicle braking device BF may be provided with a pressure sensor that detects the wheel pressure.

The first brake ECU 61 executes pressure increasing control, pressure reducing control, or holding control on the servo pressure generation device 4 based on the target wheel pressure. In the pressure increasing control, the pressure-increasing valve 42 is in the opened state and the pressure-reducing valve 41 is in the closed state. In the pressure reducing control, the pressure-increasing valve 42 is in the closed state and the pressure-reducing valve 41 is in the opened state. In the holding control, the pressure-increasing valve 42 and the pressure-reducing valve 41 are in the closed state.

Various sensors 71 to 75 are connected to the first brake ECU 61. Various sensors 76 and 77 are connected to the second brake ECU 62. The braking control device 6 acquires stroke information, master pressure information, reaction force fluid pressure information, servo pressure information, and wheel speed information from these sensors. In addition, the first brake ECU 61 and the second brake ECU 62 can acquire information (e.g., acceleration information, yaw rate information, steering angle information, etc.) flowing through the CAN (not illustrated), such as a detection result of the acceleration sensor 78 that detects acceleration in the front-rear direction of the vehicle. The second brake ECU 62 can execute pressurization control, depressurization control, or holding control on the actuator 5.

(Specific Control)

Here, specific control related to the anti-skid control will be described. The second brake ECU 62 normally determines whether or not the anti-skid control is to be executed based on the wheel speed information. For example, the second brake ECU 62 calculates the vehicle speed and the deceleration of the vehicle from the wheel speed information of all the wheels W acquired from the wheel speed sensor 76, and uses these values as determination elements for the execution of the anti-skid control. When determining to execute the anti-skid control, the second brake ECU 62 controls the actuator 5 to reduce the target wheel pressure.

As described above, in the braking state in which the braking force is applied to the vehicle according to the increase in the target deceleration of the vehicle, when the difference between the target deceleration and the actual deceleration of the vehicle is greater than or equal to a reference value, the braking control device 6 executes the anti-skid control for reducing the braking force. The braking control device 6 normally uses a value calculated based on the detection result of the wheel speed sensor 76 as the actual deceleration. Furthermore, the braking control device 6 may use the detection result of the acceleration sensor 78 as the actual deceleration. The braking control device 6 may use the deceleration of the wheel (differential value of the wheel speed) as the determination element, but in this case as well, it is consequently detected that the difference between the target deceleration and the actual deceleration is greater than or equal to the reference value.

Figure 2:
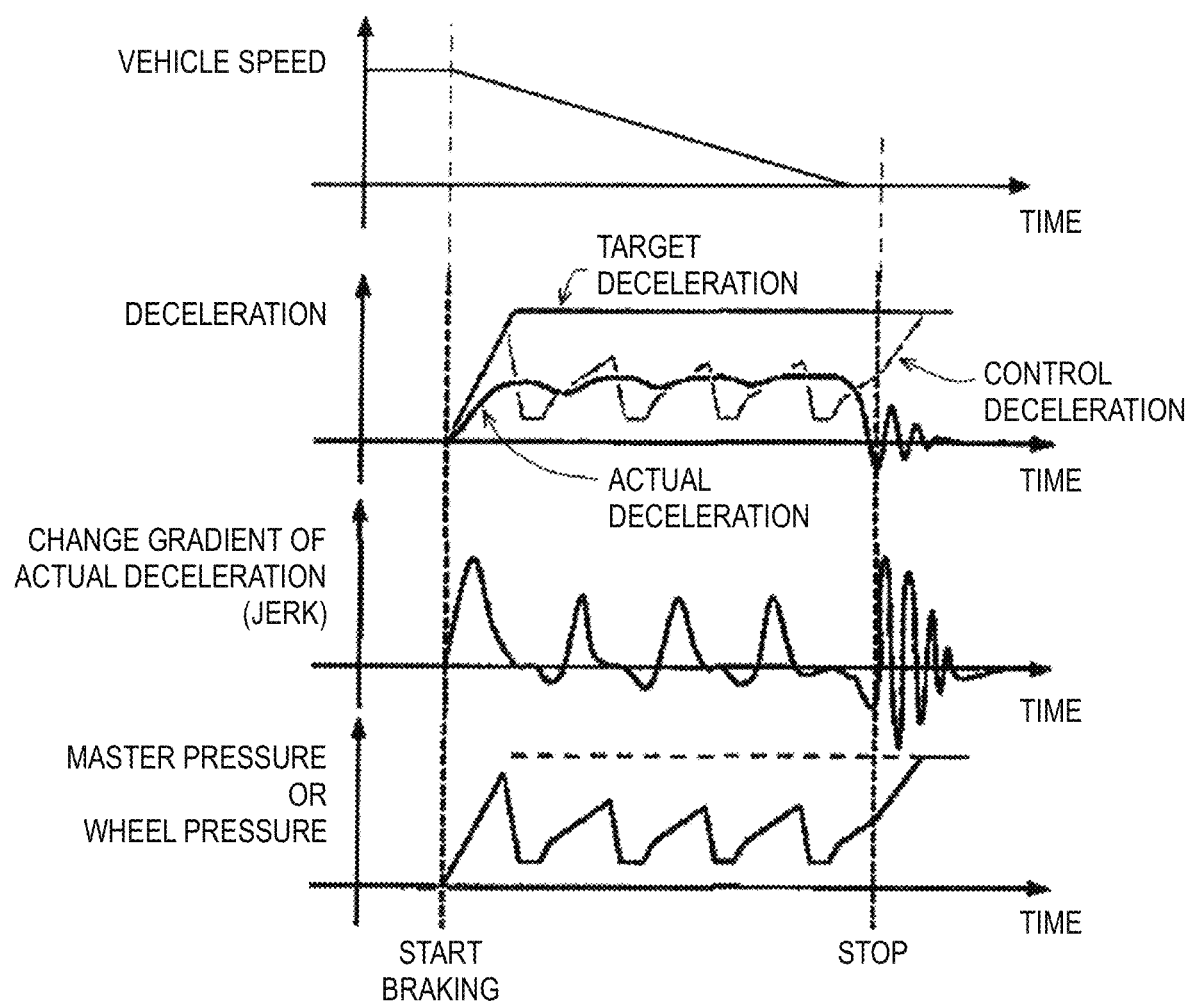
FIG. 2 is a time chart for explaining an anti-skid control of the present embodiment.

When executing the anti-skid control, the braking control device 6 sets a control deceleration used when executing the anti-skid control separately from a target deceleration set according to a request (brake operation) of the driver. The target deceleration is a value determined based on the detection result of the stroke sensor 71 and/or the pressure sensor 73, and can also be referred to as a required deceleration of the driver. On the other hand, the control deceleration is a deceleration to be achieved by controlling the actuator 5 or the servo pressure generation device 4 when executing the anti-skid control. For example, as illustrated in FIG. 2, when the anti-skid control is started, the control deceleration decreases even if the target deceleration is increased or is constant. As a term, "deceleration" can be replaced with "braking force" or "wheel pressure".

Here, the braking control device 6 of the present embodiment includes the control unit 60 that executes control related to the anti-skid control. Specifically, the control unit 60 executes the specific control for reducing the intervention degree of the anti-skid control as the response delay of the actual deceleration with respect to the increase in the target deceleration in the braking state becomes larger. As described above, at least one of the first brake ECU 61 and the second brake ECU 62 (the first brake ECU 61 in the present embodiment) includes the control unit 60.

The control unit 60 reduces the intervention degree of the anti-skid control in the specific control as the increase gradient of the target deceleration in the braking state becomes larger. As an example, in a case where the increase gradient (increase amount per unit time) of the target deceleration exceeds the threshold value, the control unit 60 determines that the response delay is large or has a high probability of becoming large, and suppresses the execution of the anti-skid control.

In a case where the increase gradient of the target deceleration exceeds the threshold value, the control unit 60 executes the specific control for retarding the execution timing of the anti-skid control. According to this specific control, the execution timing of the anti-skid control, that is, the decrease start timing of the control deceleration is retarded as the response delay of the actual deceleration with respect to the increase in the target deceleration in the braking state becomes larger. Therefore, execution of unnecessary anti-skid control is suppressed. That is, the execution accuracy of the anti-skid control can be improved. As an example of the specific control, the control unit 60 increases a reference value that is a determination criterion for the execution of the anti-skid control. In other words, the control unit 60 changes the reference value set for normal execution determination to a specific reference value for specific control larger than the reference value. The second brake ECU 62 executes the anti-skid control when the difference between the target deceleration and the actual deceleration is greater than or equal to the specific reference value. Thus, the anti-skid control is less likely to be executed when the response delay is expected to be large. When the difference between the target deceleration and the actual deceleration becomes greater than or equal to the specific reference value, the anti-skid control is executed. As described above, when the specific control is executed, the execution timing of the anti-skid control, that is, the decrease start timing of the control deceleration is retarded as compared with the case where the specific control is not executed. In the present embodiment, the reference value is variably set according to the increase gradient of the target deceleration.

When the actual deceleration becomes less than a predetermined value after the execution of the anti-skid control, the second brake ECU 62 increases the braking force by increasing the wheel pressure to be subjected to the anti-skid control (see FIG. 2). The predetermined value here is usually set according to the actual deceleration at the start of the anti-skid control. For example, the predetermined value is set to a value smaller by a predetermined ratio than the actual deceleration at the start of the anti-skid control.

Here, the control unit 60 advances the increase start timing of the braking force as the decrease gradient (decrease amount per unit time) of the actual deceleration becomes larger during the execution of the anti-skid control. In a case where the decrease gradient of the actual deceleration exceeds the threshold value during the execution of the anti-skid control, the control unit 60 increases the predetermined value serving as the determination criterion for starting the increase in braking force. In other words, when the decrease gradient of the actual deceleration exceeds the threshold value, the control unit 60 changes the currently set predetermined value to a specific predetermined value larger than the predetermined value.

The second brake ECU 62 increases the braking force to restore the braking force when the actual deceleration becomes less than the specific predetermined value during the execution of the anti-skid control. By changing the predetermined value to the specific predetermined value, the braking force can be restored earlier than before the change. That is, when the decrease gradient of the actual deceleration is large during the execution of the anti-skid control, the braking force can be increased with good responsiveness. As illustrated in FIG. 2, the change gradient of the actual deceleration is a differential value (jerk) of the actual deceleration, and the decrease gradient of the actual deceleration means a negative slope. The predetermined value is variably set according to the decrease gradient of the actual deceleration. In this manner, the control unit 60 sets the reference value according to the change gradient of the target deceleration, and sets the predetermined value according to the change gradient of the actual deceleration.

(Anti-Skid Control at Time of Abnormality)

The braking control device 6 of the present embodiment can execute the anti-skid control even when an abnormality related to the wheel speed sensor 76 occurs. For example, even when the second brake ECU 62 cannot acquire the information of the wheel speed sensor 76 for some reason or the second brake ECU 62 fails, the first brake ECU 61 executes the anti-skid control. Hereinafter, anti-skid control by the first brake ECU 61 that does not acquire the wheel speed information will be described.

Even in a situation where the wheel speed information cannot be acquired from the wheel speed sensor 76, the braking control device 6 executes the anti-skid control by controlling the servo pressure generation device 4 based on the acceleration information (deceleration information) that can be acquired from the acceleration sensor 78. The first brake ECU 61 determines whether or not the anti-skid control is to be executed based on the acceleration information acquired from the acceleration sensor 78 via the CAN.

Specifically, based on the detection results of the stroke sensor 71, the pressure sensor 73, and the acceleration sensor 78, when the difference between the target deceleration and the actual deceleration becomes greater than or equal to the reference value, the first brake ECU 61 decreases the control deceleration and controls the servo pressure generation device 4 to decrease the braking force. That is, the first brake ECU 61 executes the anti-skid control by reducing the servo pressure. In this case, as illustrated in FIG. 2, the master pressure is reduced, and the total wheel pressure is uniformly reduced. As a result, even when the wheel speed sensor 76, the second brake ECU 62, or the communication line connecting them fails, the anti-skid control is executed. In a situation where similar braking force is generated with respect to the front and rear wheels W, the slip ratio of the rear wheel Wr becomes relatively small, so that the stability is easily maintained.

Similarly to the specific control, when the increase gradient of the target deceleration exceeds the threshold value, the control unit 60 of the first brake ECU 61 increases the reference value, which is the determination criterion for executing the anti-skid control. As a result, the execution of the anti-skid control is suppressed in a situation where a response delay occurs. In addition, when the decrease gradient of the actual deceleration exceeds the threshold value during the execution of the anti-skid control, the control unit 60 increases the predetermined value serving as the determination criterion for starting increase of the braking force. As a result, the braking force can be increased with good responsiveness.

In addition, as illustrated in FIG. 2, when the actual deceleration is output in the opposite direction with respect to the target deceleration (that is, the acceleration is output) and the vehicle vibrates so that the value of the actual deceleration crosses OG, the control unit 60 determines that the vehicle has stopped and ends the anti-skid control. In addition, in a case where an actual deceleration of greater than or equal to a predetermined value is output in the opposite direction with respect to the target deceleration, that is, in a case where acceleration of greater than or equal to a predetermined value is detected, the control unit 60 determines that the vehicle is moving backward and prohibits the intervention of the anti-skid control. Furthermore, when using the information of the acceleration sensor 78, the control unit 60 stores the actual deceleration at the start of braking as 0 (reference) in consideration of a road surface disturbance such as a ramp.

As described above, according to the present embodiment including the control unit 60, when the difference between the target deceleration and the actual deceleration becomes large due to a response delay of the device configuration instead of a slip, execution of the anti-skid control is suppressed by the specific control. If the cause of the difference between the target deceleration and the actual deceleration is the response delay, the braking force increases with lapse of time, and thus the anti-skid control is unnecessary. According to the present embodiment, the anti-skid control can be suppressed from being executed in a situation where the anti-skid control is unnecessary, and the execution accuracy of the anti-skid control can be improved.

Furthermore, the control unit 60 of the present embodiment is configured to set the intervention degree (here, the reference value) of the anti-skid control according to the increase gradient of the target deceleration. As a result, it is possible to accurately detect a situation in which the probability of occurrence of the response delay is high, and a control corresponding to such a situation can be executed.

Furthermore, according to the present embodiment, the anti-skid control can be executed even in a situation or configuration in which the wheel speed information cannot be obtained. For example, in the automatic driving vehicle, even in a situation where the wheel speed information cannot be obtained due to a failure of the device or the like, the anti-skid control can be executed with high accuracy on the basis of the increase gradient of the target deceleration and the detection result of the acceleration sensor 78, according to the present embodiment. The target deceleration in the automatic driving vehicle may be, for example, a deceleration set by the ECU according to the traveling situation.

<Others>

The present disclosure is not limited to the embodiments described above. For example, the control unit 60 may determine the magnitude of the response delay of the actual deceleration on the basis of the timing at which the brake operation (increase of the target deceleration) is executed. In some vehicle braking devices, responsiveness may change according to the braking timing, for example, due to the configuration of the device. For example, the control unit 60 may determine the braking timing when braking from the non-braking state or when further braking from the braking state, and change the magnitude of the response delay according to the braking timing.

Furthermore, the control unit 60 may set the magnitude of the response delay, that is, the intervention degree of the anti-skid control on the basis of the braking timing in addition to the increase gradient of the target deceleration. In the configuration including the regulator 44 as in the present embodiment, it is conceivable that the magnitude of the response delay varies according to the braking timing even with respect to the increase gradient of the same target deceleration. In this case, the execution accuracy of the anti-skid control can be further improved by taking the braking timing into consideration.

The change in the intervention degree of the anti-skid control is not limited to change in reference value, and may be change in decrease amount of the braking force. For example, in a case where the increase gradient of the target deceleration exceeds the threshold value, the control unit 60 may decrease the decrease amount of the braking force in the anti-skid control, that is, the depressurization amount of the wheel pressure, as compared with a case where the increase gradient of the target deceleration does not exceed the threshold value. This also suppresses the anti-skid control when the response delay is large.

Furthermore, the control unit 60 may execute the anti-skid control or vehicle stabilization control on the basis of, for example, yaw rate information and/or steering angle information. Moreover, for example, even when the actuator 5 does not have a pressurization function as in the ABS actuator, the first brake ECU 61 can control the pressurization device on the upstream side (here, the servo pressure generation device 4) to execute the anti-skid control and the specific control. The braking control device 6 may be configured by one ECU. The braking control device 6 can be applied to any vehicle braking device capable of controlling the wheel pressure regardless of the number and type of pressurization devices. It can also be said that the control unit 60 increases the degree of suppression of the anti-skid control as the response delay of the actual deceleration with respect to the increase in the target deceleration becomes larger.

The invention claimed is:

1. A braking control device that executes an anti-skid control for reducing a braking force when a difference between a target deceleration and an actual deceleration of a vehicle is greater than or equal to a reference value in a braking state in which the braking force is applied to a wheel of the vehicle according to an increase in the target deceleration of the vehicle, the braking control device comprising:

a control unit that, in a case where an increase gradient of the target deceleration exceeds a threshold value, 1) determines that a response delay of the actual deceleration with respect to the increase in the target deceleration in the braking state is large or has a high probability of becoming large, and 2) executes a specific control for reducing an intervention degree of the anti-skid control;

wherein the control unit reduces the intervention degree of the anti-skid control in the specific control, by 1) increasing the reference value from an initial reference value to a specific reference value larger than the initial reference value or 2) decreasing an amount by which the braking force is reduced in the anti-skid control, as compared with a case where the increase gradient of the target deceleration does not exceed the threshold value.

2. The braking control device according to claim 1, wherein the control unit reduces the intervention degree of the anti-skid control in the specific control as the increase gradient of the target deceleration in the braking state becomes larger.

3. The braking control device according to claim 1, wherein the control unit reduces the intervention degree of the anti-skid control in the specific control, by increasing the reference value from the initial reference value to the specific reference value larger than the initial reference value, as compared with the case where the increase gradient of the target deceleration does not exceed the threshold value.

4. The braking control device according to claim 1, wherein the control unit reduces the intervention degree of the anti-skid control in the specific control, by decreasing the amount by which the braking force is reduced in the anti-skid control, as compared with the case where the increase gradient of the target deceleration does not exceed the threshold value.

* * * * *